United States Patent
Lin et al.

(10) Patent No.: US 12,430,819 B2
(45) Date of Patent: Sep. 30, 2025

(54) SYSTEMS AND METHODS FOR ENHANCING COLOR ACCURACY OF FACE CHARTS

(71) Applicant: Perfect Mobile Corp., New Taipei (TW)

(72) Inventors: Kuo-Sheng Lin, New Taipei (TW); Guo-Wei Li, New Taipei (TW)

(73) Assignee: PERFECT MOBILE CORP., New Taipei (TW)

(*) Notice: Subject to any disclaimer, the term of this patent is extended or adjusted under 35 U.S.C. 154(b) by 175 days.

(21) Appl. No.: 18/472,534

(22) Filed: Sep. 22, 2023

(65) Prior Publication Data
US 2024/0144550 A1    May 2, 2024

Related U.S. Application Data

(60) Provisional application No. 63/380,988, filed on Oct. 26, 2022.

(51) Int. Cl.
*G06T 11/00* (2006.01)
*G06V 40/16* (2022.01)

(52) U.S. Cl.
CPC .......... *G06T 11/001* (2013.01); *G06V 40/168* (2022.01)

(58) Field of Classification Search
CPC .... G06T 11/001; G06V 40/168; G06V 10/56; G06V 40/161
See application file for complete search history.

(56) References Cited

U.S. PATENT DOCUMENTS

| | | |
|---|---|---|
| 8,523,570 B2 | 9/2013 | Mallick et al. |
| 11,257,299 B2 | 2/2022 | Peng et al. |
| 11,344,102 B2 | 5/2022 | Fu et al. |
| 11,361,521 B2 | 6/2022 | Lee et al. |

(Continued)

FOREIGN PATENT DOCUMENTS

| | | |
|---|---|---|
| CN | 108573527 B | 2/2020 |
| CN | 111028318 A | 4/2020 |

(Continued)

OTHER PUBLICATIONS

NPL Video Titled "Introducing My Face Chart and Beauty Tips App!", by Greene Street Beauty (available for viewing at: https://www.youtube.com/watch?v=a9STjV9Fv9w; published 2013; select screenshots included. (Year: 2013).*

*Primary Examiner* — Daniel F Hajnik
(74) *Attorney, Agent, or Firm* — McClure, Qualey & Rodack, LLP (57) ABSTRACT

A computing device obtains an image depicting an image of a user's face. The computing device identifies facial features in the user's face in the image and extracts characteristics of the facial features in the user's face in the image. The computing device predicts a skin tone of the user's face depicted in the image and generates a face chart based on the facial feature characteristics. The computing device adjusts a color of a facial region in the face chart according to the predicted skin tone and obtains lighting characteristics of the image of the user's face. The computing device adjusts one or more colors in the face chart based on the lighting characteristics of the image of the user's face.

12 Claims, 6 Drawing Sheets
(2 of 6 Drawing Sheet(s) Filed in Color)

(56) References Cited

U.S. PATENT DOCUMENTS

| | | | |
|---|---|---|---|
| 2012/0027269 A1* | 2/2012 | Fidaleo | G09B 5/02 |
| | | | 382/118 |
| 2019/0303551 A1* | 10/2019 | Tussy | G06V 40/50 |
| 2022/0292772 A1 | 9/2022 | Wang et al. | |
| 2022/0292774 A1 | 9/2022 | Yang et al. | |

FOREIGN PATENT DOCUMENTS

| | | |
|---|---|---|
| CN | 111626130 A | 9/2020 |
| WO | 2019/228473 A1 | 12/2019 |

* cited by examiner

SYSTEMS AND METHODS FOR ENHANCING COLOR ACCURACY OF FACE CHARTS

CROSS-REFERENCE TO RELATED APPLICATION

This application claims priority to, and the benefit of, U.S. Provisional patent application entitled, "Adjust background color for face chart generator," having Ser. No. 63/380,988, filed on Oct. 26, 2022, which is incorporated by reference in its entirety.

TECHNICAL FIELD

The present disclosure generally relates to systems and methods for enhancing the color accuracy of face charts.

SUMMARY

In accordance with one embodiment, a computing device obtains an image depicting an image of a user's face. The computing device identifies facial features in the user's face in the image and extracts characteristics of the facial features in the user's face in the image. The computing device predicts a skin tone of the user's face depicted in the image and generates a face chart based on the facial feature characteristics. The computing device adjusts a color of a facial region in the face chart according to the predicted skin tone and obtains lighting characteristics of the image of the user's face. The computing device adjusts one or more colors in the face chart based on the lighting characteristics of the image of the user's face.

Another embodiment is a system that comprises a memory storing instructions and a processor coupled to the memory. The processor is configured by the instructions to obtain an image depicting an image of a user's face. The processor is further configured to identify facial features in the user's face in the image and extract characteristics of the facial features in the user's face in the image. The processor is further configured to predict a skin tone of the user's face depicted in the image and generate a face chart based on the facial feature characteristics. The processor is further configured to adjust a color of a facial region in the face chart according to the predicted skin tone and obtain lighting characteristics of the image of the user's face. The processor is further configured to adjust one or more colors in the face chart based on the lighting characteristics of the image of the user's face.

Another embodiment is a non-transitory computer-readable storage medium storing instructions to be implemented by a computing device. The computing device comprises a processor, wherein the instructions, when executed by the processor, cause the computing device to obtain an image depicting an image of a user's face. The processor is further configured by the instructions to identify facial features in the user's face in the image and extract characteristics of the facial features in the user's face in the image. The processor is further configured by the instructions to predict a skin tone of the user's face depicted in the image and generate a face chart based on the facial feature characteristics. The processor is further configured by the instructions to adjust a color of a facial region in the face chart according to the predicted skin tone and obtain lighting characteristics of the image of the user's face. The processor is further configured by the instructions to adjust one or more colors in the face chart based on the lighting characteristics of the image of the user's face.

Other systems, methods, features, and advantages of the present disclosure will be apparent to one skilled in the art upon examining the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various aspects of the disclosure are better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

The subject disclosure is now described with reference to the drawings, where like reference numerals are used to refer to like elements throughout the following description. Other aspects, advantages, and novel features of the disclosed subject matter will become apparent from the following detailed description and corresponding drawings.

Embodiments are disclosed for enhancing the color accuracy of face charts by adjusting the color of the facial region in the face charts based on the lighting characteristics of the image of the user's face, adjusting the color of the background in the face chart, or a combination of both. Enhancing the color accuracy of face charts is needed to facilitate the optimal selection and application of cosmetic products for the users represented in the face charts. A description of a system for enhancing the color accuracy of face charts is described followed by a discussion of the operation of the components within the system.

Figure 1:
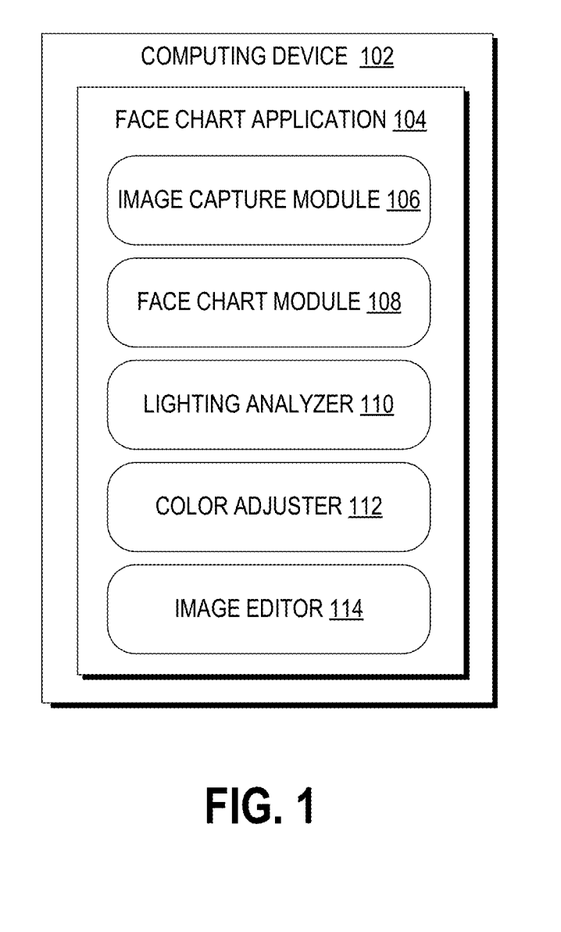
FIG. 1 is a block diagram of a computing device configured to enhance the color accuracy of face charts according to various embodiments of the present disclosure.

FIG. 1 is a block diagram of a computing device 102 in which the embodiments disclosed herein may be implemented. The computing device 102 may comprise one or more processors that execute machine executable instructions to perform the features described herein. For example, the computing device 102 may be embodied as a computing device such as, but not limited to, a smartphone, a tablet-computing device, a laptop, and so on.

A face chart application 104 executes on a processor of the computing device 102 and includes an image capture module 106, a face chart module 108, a lighting analyzer 110, a color adjuster 112, and an image editor 114. The image capture module 106 is configured to obtain digital images of a user's facial region and display the user's face on a display of the computing device 102. The computing device 102 may also be equipped with the capability to connect to the Internet, and the image capture module 106 may be configured to obtain an image or video of the user from another device or server.

The images obtained by the image capture module 106 may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats. The video may be encoded in formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), 360 degree video, 3D scan model, or any number of other digital formats.

The face chart module 108 is executed by the processor of the computing device 102 to identify facial features in the image obtained by the image capture module 106 and extract characteristics of the facial features of the user depicted in the image. Such characteristics may comprise the size and shape of facial features depicted in the image, the overall size and shape of the user's face, contouring information of the user's face, and so on. The face chart module 108 generates a face chart based on the facial feature characteristics, where the face chart depicts the user's facial features. The face chart module 108 is further configured to predict the skin tone of the user's face depicted in the image and adjust the color of the face chart according to the predicted skin tone.

The lighting analyzer 110 is executed to analyze the lighting environment depicted in the image of the user's face and obtain lighting characteristics of the user's face. Such lighting characteristics may include the lighting intensity of pixels in the entire image or specifically in the facial region of the user and reflects the lighting environment surrounding the user depicted in the image.

The color adjuster 112 is executed to adjust the color of the facial region in the face chart and/or adjust the color of the background in the face chart based on the lighting characteristics and output a face chart with the adjusted colors. The image editor 114 is executed to perform virtual application of one or more cosmetic products on the user's face utilizing the face chart with the adjusted colors.

Figure 2:
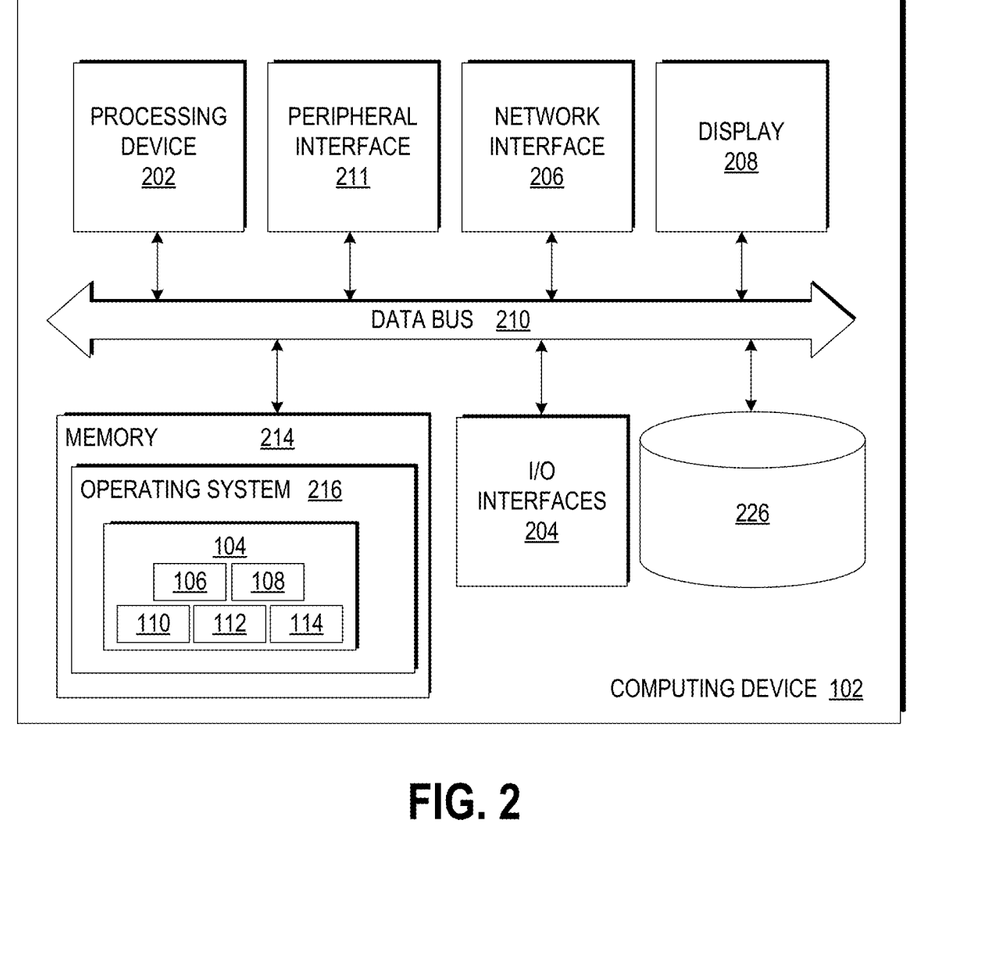
FIG. 2 is a schematic diagram of the computing device of FIG. 1 in accordance with various embodiments of the present disclosure.

FIG. 2 illustrates a schematic block diagram of the computing device 102 in FIG. 1. The computing device 102 may be embodied as a desktop computer, portable computer, dedicated server computer, multiprocessor computing device, smart phone, tablet, and so forth. As shown in FIG. 2, the computing device 102 comprises memory 214, a processing device 202, a number of input/output interfaces 204, a network interface 206, a display 208, a peripheral interface 211, and mass storage 226, wherein each of these components are connected across a local data bus 210.

The processing device 202 may include a custom made processor, a central processing unit (CPU), or an auxiliary processor among several processors associated with the computing device 102, a semiconductor based microprocessor (in the form of a microchip), a macroprocessor, one or more application specific integrated circuits (ASICs), a plurality of suitably configured digital logic gates, and so forth.

The memory 214 may include one or a combination of volatile memory elements (e.g., random-access memory (RAM) such as DRAM and SRAM) and nonvolatile memory elements (e.g., ROM, hard drive, tape, CDROM). The memory 214 typically comprises a native operating system 216, one or more native applications, emulation systems, or emulated applications for any of a variety of operating systems and/or emulated hardware platforms, emulated operating systems, etc. For example, the applications may include application specific software that may comprise some or all the components of the computing device 102 displayed in FIG. 1.

In accordance with such embodiments, the components are stored in memory 214 and executed by the processing device 202, thereby causing the processing device 202 to perform the operations/functions disclosed herein. For some embodiments, the components in the computing device 102 may be implemented by hardware and/or software.

Input/output interfaces 204 provide interfaces for the input and output of data. For example, where the computing device 102 comprises a personal computer, these components may interface with one or more input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
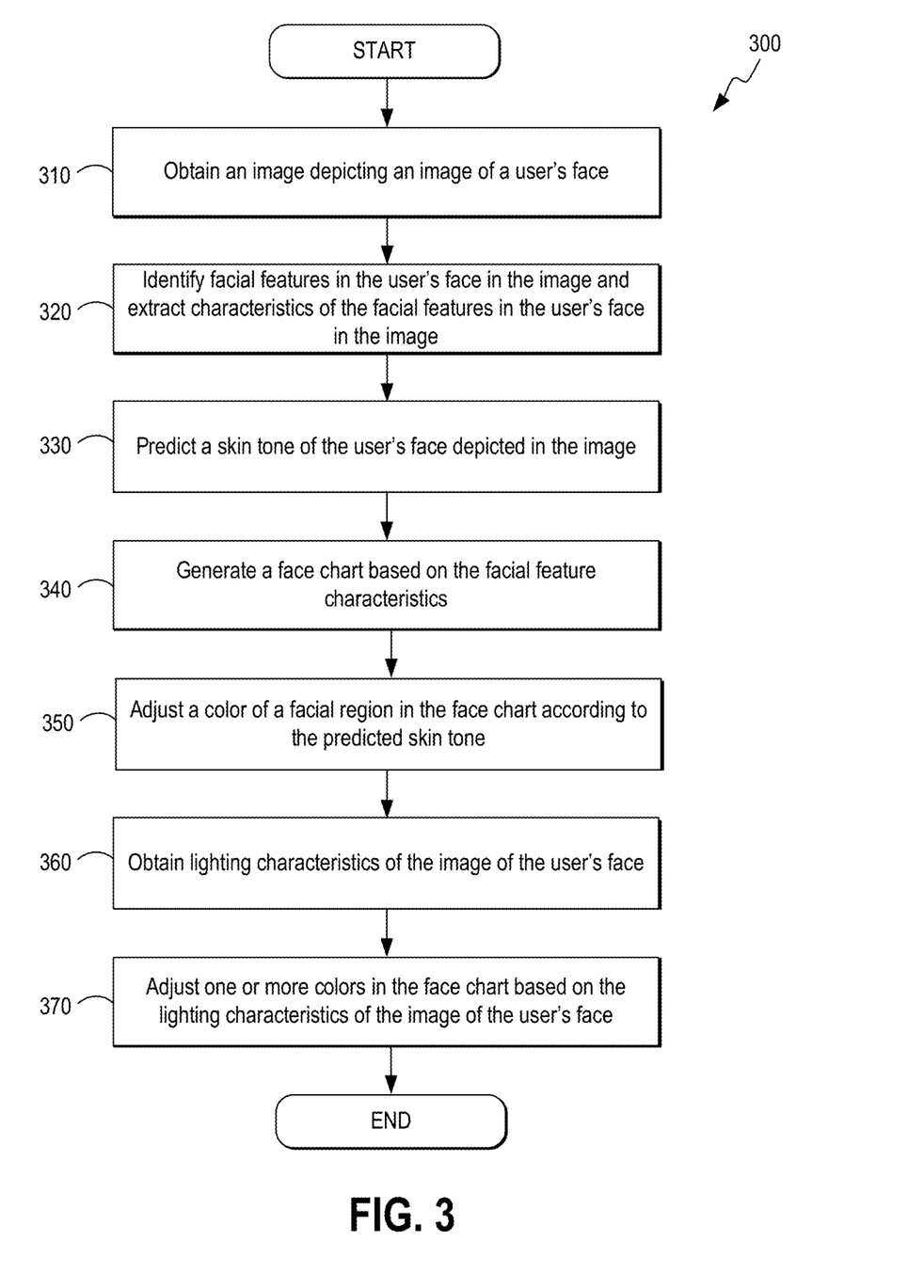
FIG. 3 is a top-level flowchart illustrating examples of functionality implemented as portions of the computing device of FIG. 1 for enhancing the color accuracy of face charts according to various embodiments of the present disclosure.

Reference is made to FIG. 3, which is a flowchart 300 in accordance with various embodiments for enhancing the color accuracy of face charts, where the operations are performed by the computing device 102 of FIG. 1. It is understood that the flowchart 300 of FIG. 3 provides merely an example of the different types of functional arrangements that may be employed to implement the operation of the various components of the computing device 102. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is displayed. For example, the order of execution of two or more blocks may be scrambled relative to the order shown. In addition, two or more blocks shown in succession in FIG. 3 may be executed concurrently or with partial concurrence. It is understood that all such variations are within the scope of the present disclosure.

At block 310, the computing device 102 obtains an image depicting a user's face. At block 320, the computing device 102 identifies facial features in the user's face in the image and extracts characteristics of the facial features in the user's face in the image. At block 330, the computing device 102 predicts a skin tone of the user's face depicted in the image. For some embodiments, the computing device 102 predicts the skin tone of the user's face depicted in the image by executing a machine-learning algorithm based on other images of the user and other individuals.

At block 340, the computing device 102 generates a face chart based on the facial feature characteristics. At block 350, the computing device 102 adjusts a color of a facial region in the face chart according to the predicted skin tone. At block 360, the computing device 102 obtains lighting characteristics of the image of the user's face. For some embodiments, the computing device 102 obtains the lighting characteristics of the image by obtaining a luminance level for pixels in the image of the user's face and determining an average value of the luminance levels of the pixels in the user's face depicted in the image.

At block 370, the computing device 102 adjusts one or more colors in the face chart based on the lighting characteristics of the image of the user's face. For some embodiments, the computing device 102 adjusts the one or more colors in the face chart based on the lighting characteristics of the image by determining an average value of luminance values of pixels of the user's face depicted in the image and adjusting a color of a background in the face chart based on the average value. For some embodiments, the computing device 102 adjusts the one or more colors in the face chart based on the lighting characteristics of the image by determining an average value of luminance values of pixels of the user's face depicted in the image and adjusting a color of the facial region in the face chart based on the average value. Thereafter, the process in FIG. 3 ends.

Figure 4:
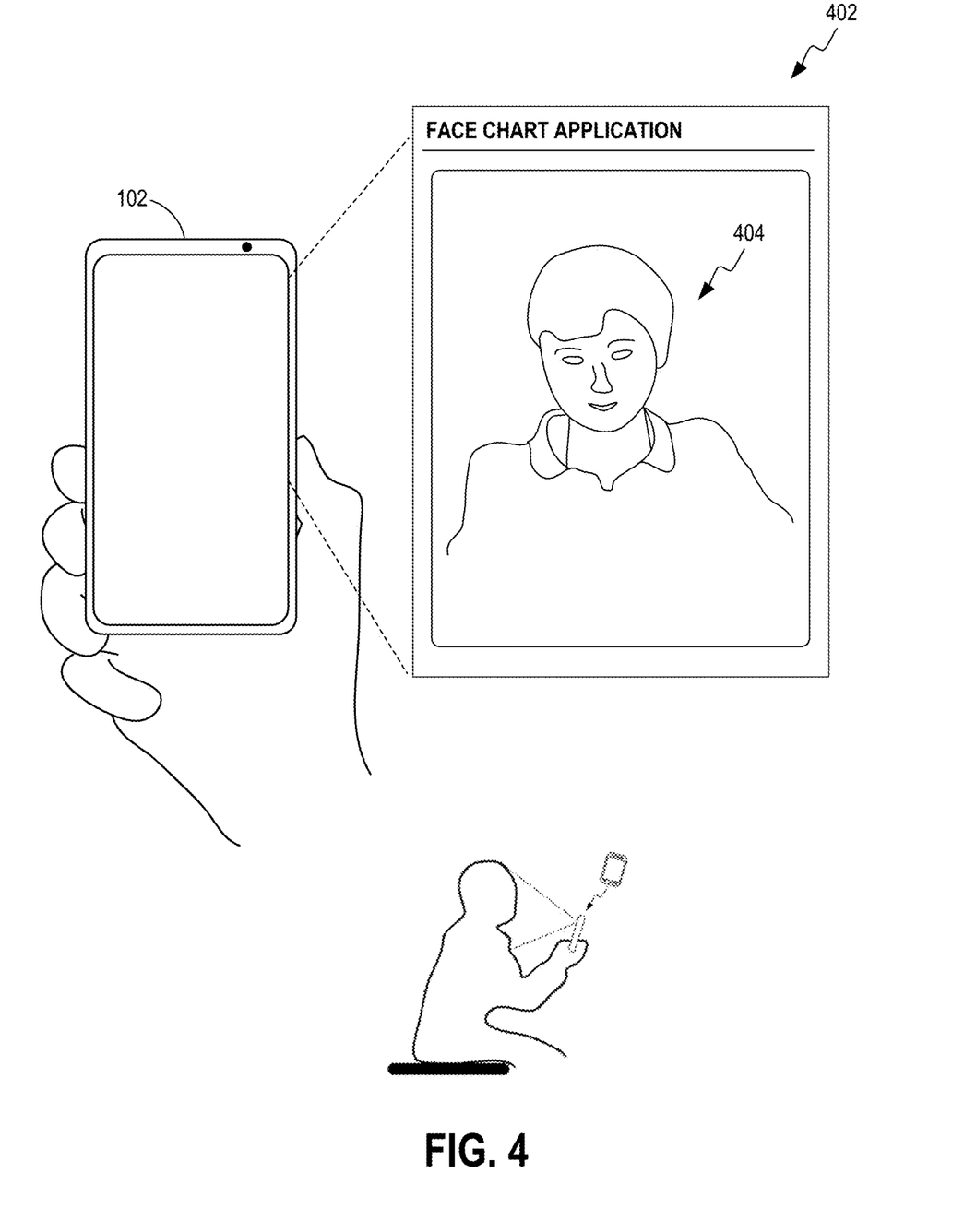
FIG. 4 illustrates an example user interface provided on a display of the computing device according to various embodiments of the present disclosure.

To illustrate various features of the present invention, reference is made to the figures described below. FIG. 4 illustrates an example user interface 402 provided on a display of the computing device 102 whereby an image of the user's face 404 is captured and displayed to the user. For some implementations, the image capture module 106 (FIG. 1) executing in the computing device 102 may be configured to cause a front-facing camera of the computing device 102 to capture an image or a video of a user's face 404 for purposes of generating a face chart of the user's face. The computing device 102 may also be equipped with the capability to connect to the Internet, and the image capture module 106 may be configured to obtain an image or video of the user from another device or server.

Figure 5:
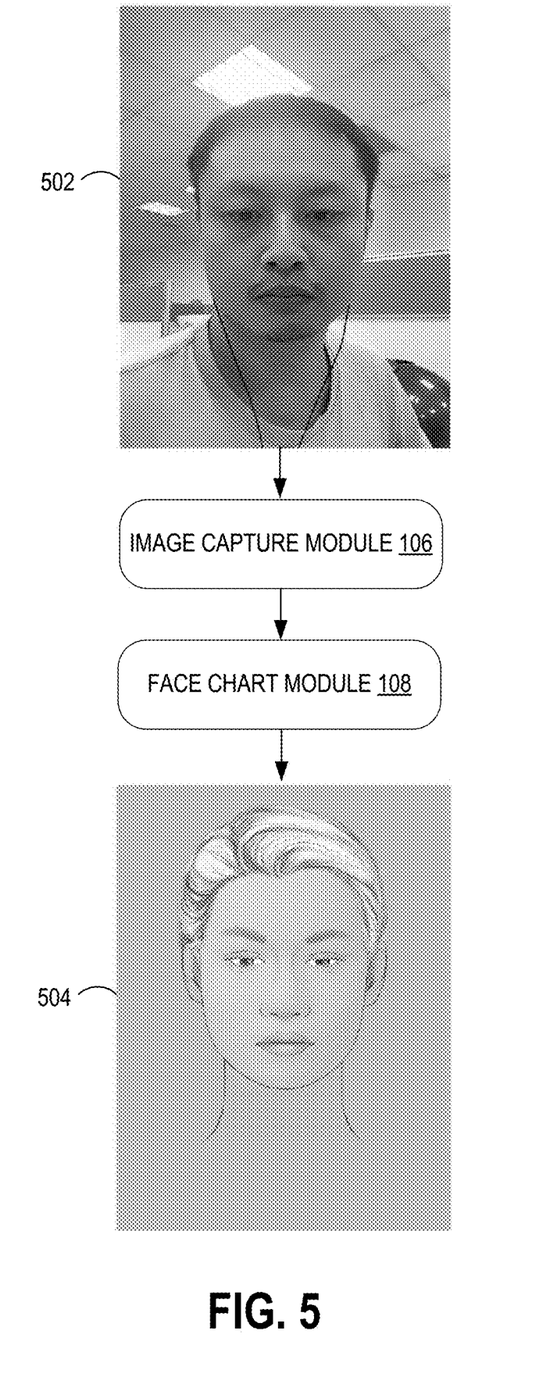
FIG. 5 illustrates the computing device 102 of FIG. 1 generating a face chart from an image of the user's face according to various embodiments of the present disclosure.

FIG. 5 illustrates the computing device 102 of FIG. 1 generating a face chart from an image of the user's face according to various embodiments. As described above, the image capture module 106 obtains a digital image 502 of a user's facial region and displays the user's face. The face chart module 108 identifies facial features depicted in the image 502 obtained by the image capture module 106 and extracts characteristics of the facial features in the image. Such characteristics may comprise the size and shape of facial features depicted in the image, the overall size and shape of the user's face, contouring of the user's face, and so on.

The face chart module 108 generates a face chart 504 based on these facial feature characteristics, where the face chart 504 depicts the user's facial features. The face chart module 108 is further configured to predict the skin tone of the user's face depicted in the image and adjust the color of the face chart 504 according to the predicted skin tone. For some embodiments, the face chart module 108 predicts the skin tone of the user's face depicted in the image by executing a machine-learning algorithm based on other images of the user and other individuals. As described above, the computing device 102 may also be equipped with the capability to connect to the Internet, and the face chart module 108 may obtain a face chart of the user from another device or server.

Figure 6:
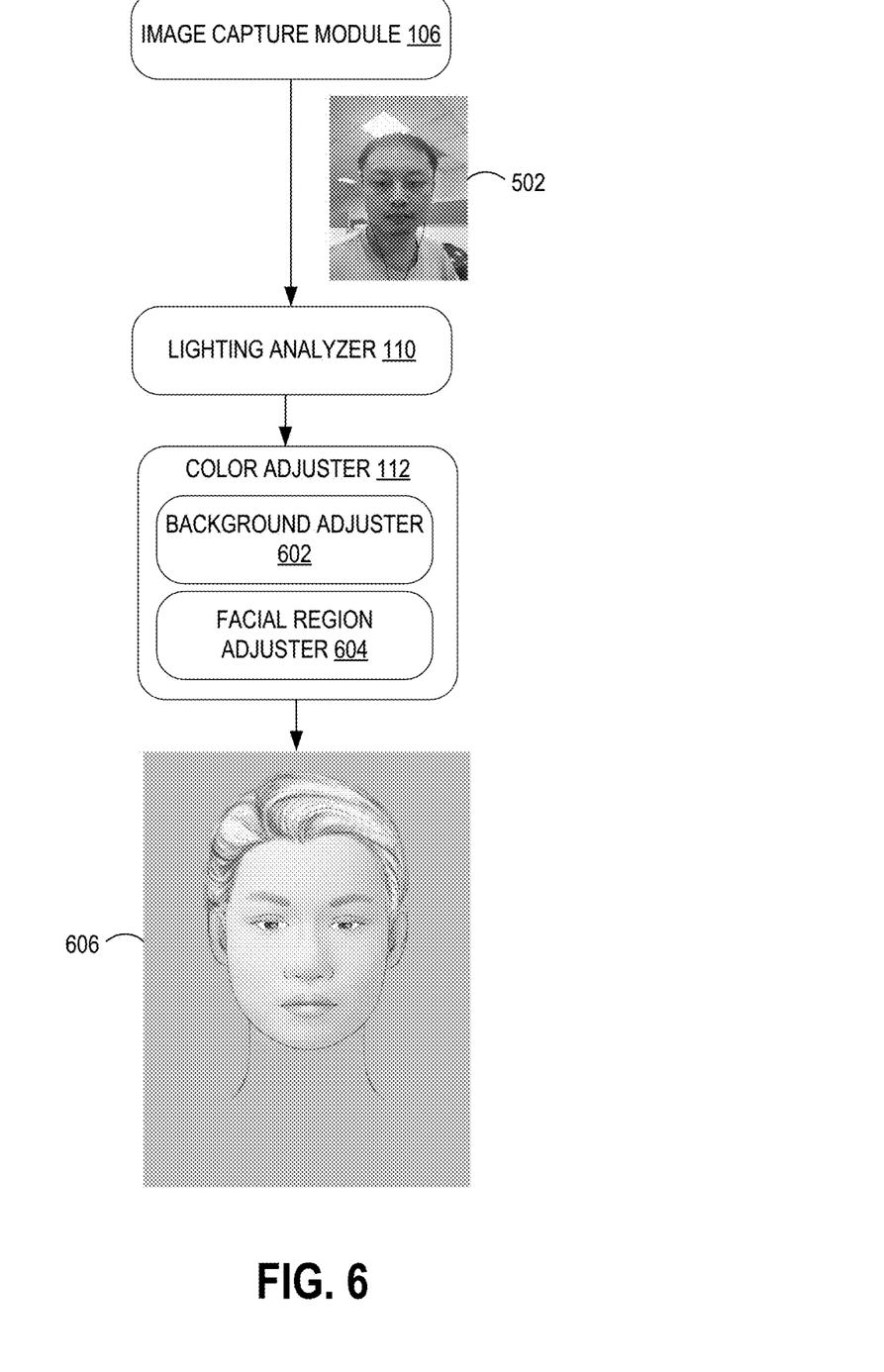
FIG. 6 illustrates the computing device of FIG. 1 adjusting one or more colors in the face chart image based on the lighting characteristics of the image of the user's face according to various embodiments of the present disclosure.

FIG. 6 illustrates the computing device 102 of FIG. 1 adjusting one or more colors in the face chart image based on the lighting characteristics of the image 502 of the user's face. As described above, the lighting analyzer 110 analyzes the lighting environment depicted in the image 502 of the user's face to obtain lighting characteristics of the user's face. Such lighting characteristics may include the lighting intensity of pixels in the entire image 502 or specifically in the facial region of the user and reflects the lighting environment depicted in the image 502. For some embodiments, the lighting analyzer 110 obtains the lighting characteristics of the image 502 by obtaining a luminance level for pixels in the image 502 of the user's face and determining an average value of the luminance levels of the pixels in the user's face depicted in the image 502.

For some embodiments, the color adjuster 112 further comprises a background adjuster 602 configured to adjust the color of the background depicted in the face chart 606. For some embodiments, the background adjuster 602 adjusts the one or more colors in the face chart 606 by determining an average value of luminance values of pixels of the user's face depicted in the image and adjusting a color of a background in the face chart based on the average value.

For some embodiments, the color adjuster 112 also includes a facial region adjuster 604 configured to adjust the color of the facial region depicted in the face chart 606. For some embodiments, the facial region adjuster 604 adjusts the one or more colors in the face chart by determining an average value of luminance values of pixels of the user's face depicted in the image and adjusting a color of the facial region in the face chart based on the average value.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are included herein within the scope of this disclosure and protected by the following claims.

At least the following is claimed:

1. A method implemented in a computing device, comprising:
   obtaining an image depicting an image of a user's face;
   identifying facial features in the user's face in the image and extracting characteristics of the facial features in the user's face in the image;
   predicting a skin tone of the user's face depicted in the image, wherein predicting the skin tone of the user's face depicted in the image is performed by executing a machine-learning algorithm based on other images of the user and other individuals;

generating a face chart based on the facial feature characteristics;

adjusting a color of a facial region in the face chart according to the predicted skin tone;

obtaining lighting characteristics of the image of the user's face; and adjusting one or more colors in the face chart based on the lighting characteristics of the image of the user's face.

2. The method of claim 1, wherein adjusting the one or more colors in the face chart based on the lighting characteristics of the image comprises:

determining an average value of luminance values of pixels of the user's face depicted in the image; and adjusting a color of a background in the face chart based on the average value.

3. The method of claim 1, wherein adjusting the one or more colors in the face chart based on the lighting characteristics of the image comprises:

determining an average value of luminance values of pixels of the user's face depicted in the image; and adjusting a color of the facial region in the face chart based on the average value.

4. The method of claim 1, wherein obtaining the lighting characteristics of the image comprises:

obtaining a luminance level for pixels in the image of the user's face; and determining an average value of the luminance levels of the pixels in the user's face depicted in the image.

5. A system, comprising:

a memory storing instructions;

a processor coupled to the memory and configured by the instructions to at least:

obtain an image depicting an image of a user's face;

identify facial features in the user's face in the image and extract characteristics of the facial features in the user's face in the image;

predict a skin tone of the user's face depicted in the image, wherein the processor is configured to predict the skin tone of the user's face depicted in the image by executing a machine-learning algorithm based on other images of the user and other individuals;

generate a face chart based on the facial feature characteristics;

adjust a color of a facial region in the face chart according to the predicted skin tone;

obtain lighting characteristics of the image of the user's face; and adjust one or more colors in the face chart based on the lighting characteristics of the image of the user's face.

6. The system of claim 5, wherein the processor is configured to adjust the one or more colors in the face chart based on the lighting characteristics of the image by:

determining an average value of luminance values of pixels of the user's face depicted in the image; and adjusting a color of a background in the face chart based on the average value.

7. The system of claim 5, wherein the processor is configured to adjust the one or more colors in the face chart based on the lighting characteristics of the image by:

determining an average value of luminance values of pixels of the user's face depicted in the image; and adjusting a color of the facial region in the face chart based on the average value.

8. The system of claim 5, wherein the processor is configured to obtain the lighting characteristics of the image by:

obtaining a luminance level for pixels in the image of the user's face; and determining an average value of the luminance levels of the pixels in the user's face depicted in the image.

9. A non-transitory computer-readable storage medium storing instructions to be implemented by a computing device having a processor, wherein the instructions, when executed by the processor, cause the computing device to at least:

obtain an image depicting an image of a user's face;

identify facial features in the user's face in the image and extract characteristics of the facial features in the user's face in the image;

predict a skin tone of the user's face depicted in the image, wherein the processor is configured by the instructions to predict the skin tone of the user's face depicted in the image by executing a machine-learning algorithm based on other images of the user and other individuals;

generate a face chart based on the facial feature characteristics;

adjust a color of a facial region in the face chart according to the predicted skin tone;

obtain lighting characteristics of the image of the user's face; and adjust one or more colors in the face chart based on the lighting characteristics of the image of the user's face.

10. The non-transitory computer-readable storage medium of claim 9, wherein the processor is configured by the instructions to adjust the one or more colors in the face chart based on the lighting characteristics of the image by:

determining an average value of luminance values of pixels of the user's face depicted in the image; and adjusting a color of a background in the face chart based on the average value.

11. The non-transitory computer-readable storage medium of claim 9, wherein the processor is configured by the instructions to adjust the one or more colors in the face chart based on the lighting characteristics of the image by:

determining an average value of luminance values of pixels of the user's face depicted in the image; and adjusting a color of the facial region in the face chart based on the average value.

12. The non-transitory computer-readable storage medium of claim 9, wherein the processor is configured by the instructions to obtain the lighting characteristics of the image by:

obtaining a luminance level for pixels in the image of the user's face; and determining an average value of the luminance levels of the pixels in the user's face depicted in the image.

\* \* \* \* \*